(12) United States Patent
Vilander

(10) Patent No.: US 7,193,987 B2
(45) Date of Patent: Mar. 20, 2007

(54) IP COMMUNICATION IN A CELLULAR TELECOMMUNICATIONS SYSTEM

(75) Inventor: Harri Tapani Vilander, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1085 days.

(21) Appl. No.: 10/239,019

(22) PCT Filed: Mar. 7, 2001

(86) PCT No.: PCT/EP01/02616

§ 371 (c)(1),
(2), (4) Date: Sep. 17, 2002

(87) PCT Pub. No.: WO01/72007

PCT Pub. Date: Sep. 27, 2001

(65) Prior Publication Data

US 2003/0050051 A1 Mar. 13, 2003

(30) Foreign Application Priority Data

Mar. 18, 2000 (GB) .................................. 0006464.2

(51) Int. Cl.
*H04Q 7/24* (2006.01)
*H04L 12/28* (2006.01)
*G06F 15/16* (2006.01)

(52) U.S. Cl. ...................... 370/338; 370/401; 370/338; 709/228

(58) Field of Classification Search ................ 370/331, 370/338, 339, 352–356, 392, 401; 455/433, 455/560; 709/204, 228, 230, 245
See application file for complete search history.

(56) References Cited

U.S. PATENT DOCUMENTS

| 5,910,946 | A | 6/1999 | Csapo |
| 6,421,674 | B1 * | 7/2002 | Yoakum et al. ................ 707/10 |
| 6,446,127 | B1 * | 9/2002 | Schuster et al. ............ 709/227 |
| 6,584,490 | B1 * | 6/2003 | Schuster et al. ............ 709/200 |
| 6,636,596 | B1 * | 10/2003 | Gallant et al. ......... 379/220.01 |
| 6,795,444 | B1 * | 9/2004 | Vo et al. ..................... 370/401 |
| 6,876,633 | B2 * | 4/2005 | Strathmeyer et al. ....... 370/260 |
| 2002/0118675 | A1 * | 8/2002 | Strathmeyer et al. ....... 370/352 |
| 2003/0200260 | A1 * | 10/2003 | Donovan et al. ........... 709/203 |
| 2004/0258239 | A1 * | 12/2004 | Gallant et al. .............. 379/900 |

OTHER PUBLICATIONS

Schulzrinne H, et al: "Internet Telephony: Architecture and Protocols—an IETF Perspective" Computer Networks and ISDN Systems, NL, North Holland Publishing. Amsterdam, vol. 31, No. 3, Feb. 11, 1999, pp. 237-255, XP000700321.

Moh M, et al: "Mobile IP Telephony: Mobility Support of SIP" Proceedings of the International Conference on Computer Communications and Networks. XX, XX, Oct. 11, 1999, pp. 554-559, XP002143545.

* cited by examiner

*Primary Examiner*—Seema S. Rao
*Assistant Examiner*—Hong Sol Cho

(57) ABSTRACT

A method of alerting a mobile wireless subscriber (11) registered with a mobile wireless communication network (1) to a session initiation request sent by a calling party (7). The method comprises receiving a SIP Invite message at a Home SIP server (8) of the mobile network (1), the SIP Invite message containing a SIP URL identifying said mobile subscriber (11). Using the SIP URL, the identity of a ACP (3) with which the mobile subscriber (11) is currently registered is identified and a paging message broadcast to said mobile subscriber (11) from said ACP (3).

29 Claims, 5 Drawing Sheets

IP COMMUNICATION IN A CELLULAR TELECOMMUNICATIONS SYSTEM

FIELD OF THE INVENTION

The present invention relates to IP communication in a cellular telecommunications system and more particularly to IP addressing for mobile hosts in such a system.

BACKGROUND TO THE INVENTION

Future mobile telecommunication systems such as UMTS define three operational states for mobile terminals. These are: an "Idle" state in which the terminal is not active, e.g. it is switched off or otherwise not registered with the network; a "Connected" state in which the terminal is switched on and registered with the network but is not currently involved in a communication session; and an "Active" state in which the terminal is switched on, registered with the network, and currently involved in a communication session.

There exists a desire in the telecommunications industry and amongst consumers to enable mobile wireless terminals to send and receive Internet Protocol (IP) data to and from the Internet and other IP networks. There is also a desire to allow mobile terminals to be in an "Always On" state, whereby the terminals can initiate the sending and receiving of IP data when in a Connected state (as well of course as in an Active state) without the need for a "full-blown" connection set-up phase, other than the set-up phase required when the terminals are initially powered-up. The "Always On" state requires the permanent allocation of an IP address to a mobile terminal, at least for the time that the mobile terminal is switched on, and eliminates the need for a connection set-up phase each time an Internet session is initiated.

The traditional Always On concept will allow the provision of "push-services" where data may be sent to a mobile terminal without any direct initiation by the subscriber. Examples of push services are the delivery of up to the minute news and stock market information to mobile subscribers. A permanent IP address as provided for in the Always On concept may also be required for longer term data transfer such as during a working session, e.g. multiple file transfers, the sending/fetching of e-mails, etc.

In order to have IP access, a mobile wireless terminal must have allocated to it a globally unique IP address. According to the Always On concept, a mobile wireless terminal, which is registered for example with a GSM or UMTS telecommunications network comprising a General Packet Radio Service (GPRS) network, will be allocated a globally unique IP address upon registration by a control node, referred to below as an "Access Control Point" (ACP). An ACP is in fact an enhanced Media Gateway Controller (MGC).

The ACP can be regarded as a server node (or group of nodes) which takes part in certain control plane operations such as mobility management (MM) and session management. The ACP may control one or more Gateway nodes which handle user data. The proposed UMTS architecture for packet switched services is illustrated in FIG. 1 (n.b. if the HLR and ACPs are in different networks, the networks are referred to respectively as the "home" network and the "foreign" network), where the leftmost ACP node corresponds to a Serving GPRS Support Node (SGSN) and the rightmost node corresponds to a Gateway GPRS Support Node (GGSN). The IP address allocated by the ACP will be allocated to the mobile terminal until such time as the terminal de-registers from the ACP (e.g. the power is switched off or the terminal leaves the coverage area of the ACP).

In a modification to the architecture of FIG. 1, the gateway node may be integrated into the Radio Network Controller (RNC) node. The ACP may or may not be part of the RNC node. This modified architecture is referred to below as a "Direct Internet Access" (DIA) architecture.

Assuming that many hundreds of thousands (or even millions) of mobile terminals are registered with a network and are in the Always On state, problems may arise due to the limited address space available with IP (especially with IPv4). Additionally, allocated IP addresses require storage and processing capacity in the routers and gateway nodes of mobile networks. An allocated IP address must be reserved for a mobile terminal even if the terminal is not engaged in a call, in order to enable the transfer of downlink traffic to the terminal and to allow for real "Always On" service. Furthermore, maintaining unused active "contexts" in a gateway means wasted processing and storage capacity.

Another problem related to the conventional Always On architecture is the resulting increased volume and complexity of Mobile IP (MIP) related mobility management signalling traffic. If MIP protocols are used for handling mobility management within a mobile network, the network must allocate a new IP address (care-of-address) to a terminal when it roams in the network. The volume of mobility management signalling traffic increases as, in addition to notifying the Home Location Register (HLR) of its current location, the mobile terminal must also inform its Home Agent (which is responsible for routing datagrams from the home network to roaming terminals) of its current IP address, even if the terminal is not engaged in a call.

Yet another problem associated with the Always On concept is a possible decrease in the level of a user's privacy. If a mobile terminal uses a permanently allocated IP address, it may be possible to track the movement of the terminal in the Internet. Furthermore, the current location of a mobile terminal may be revealed if a dynamically allocated IP address is stored and associated with a subscriber (or terminal) identity in a location database in the Internet (e.g. a Domain Name System (DNS) server). It may therefore be possible for a hostile party to query the current location of a mobile terminal.

SUMMARY OF THE INVENTION

The present invention takes advantage of the fact that many mobile subscribers will only seldom require Internet access and therefore do not need to have IP addresses permanently allocated to them. Addresses need therefore only be allocated when an incoming call to a mobile terminal is initiated. Whilst the amount of signalling (between the network and mobile terminals) involved in an individual IP address establishment process may be increased, this is offset by simplified mobility management procedures for mobile terminals in a Connected state.

It is an object of the present invention to overcome or at least mitigate the disadvantages of IP addressing for mobile terminals noted above. In particular, it is an object of the present invention to provide an addressing method whereby a mobile subscriber is allocated an IP address in the event that a calling party wishes to initiate a connection session.

These and other objects are achieved at least in part by employing the Session Initiation Protocol according to which a mobile subscriber is allocated a SIP URL which is used by a calling party to identify the called mobile subscriber to a cellular telecommunications network.

According to a first aspect of the present invention there is provided a method of alerting a mobile wireless subscriber registered with a mobile wireless communication network to a session initiation request sent by a calling party, the method comprising:

receiving a SIP Invite message at a SIP server of the mobile network, the SIP Invite message containing a SIP URL identifying said mobile subscriber;

using the SIP URL to determine the identity of a second SIP server of an Access Control Point (ACP) serving the mobile subscriber;

sending a SIP Invite message to said second SIP server; and causing a paging message to be broadcast to said mobile subscriber.

Due to the use of SIP, embodiments of the present invention provide for the allocation of an IP address to a mobile subscriber only at initiation of a communication session. The subscriber's terminal can remain in a Connected state, with no allocated IP address, when no session is in progress. As with the Always On concept, embodiments of the present invention may allow the implementation of push-services.

The "virtual" Always On architecture proposed, provides for better privacy and security as no location data needs to be stored in a public database, call control server (e.g. SIP server), etc. Instead, for example, location data may be stored in a HLR which is a closed, not publicly available, database. As an IP address is allocated only upon request (e.g. in connecting incoming/outgoing calls) and is valid only during a given call, tracking the whereabouts of a mobile terminal is made more difficult. The architecture allows mobile subscribers to be always available without revealing their location to third parties. The current location (unique IP address) of the calling party is revealed only if the called party decides to accept a call.

The ACP corresponds to a Media Gateway Controller (MGC), but additionally having responsibility for mobility management and IP address allocation. The ACP is a logical node which may be implemented as a physical stand-alone node, or may comprise a pair of SGSN/GGSN nodes (GPRS), or may be integrated into an RNC node (UMTS).

Preferably, the method comprises the step of identifying a mobile subscriber identity corresponding to a SIP URL contained in the SIP Invite message, said mobile subscriber identity and said SIP UTRL identifying the called mobile subscriber. An association between SIP URLs and mobile subscriber identities is maintained by a location register of the mobile network (e.g. a Home Location Register). The location register additionally maintains information on the current location of mobile subscribers. More preferably, upon receipt of a SIP invite message at the SIP server, the SIP server sends a query, containing the SIP URL of the called mobile subscriber, to the location register which responds by returning the current location of the mobile subscriber and, optionally, the associated mobile subscriber identity. The current location may be the identity (e.g. unique name or IP address) of said second SIP server. In an alternative embodiment, the location register may return to the SIP sender only the current location, in which case the serving ACP may subsequently send a query to the location register in order to retrieve the mobile subscriber identity.

Preferably, when the SIP server receives the called mobile subscriber's current location from the location register, the SIP server sends a SIP invite message to said second SIP server. The second SIP server buffers the received message whilst a paging message is sent over the air interface to the called subscriber. In the event that a connection is established between the called subscriber and the serving ACP, the serving ACP allocates an IP address to the called subscriber and a SIP Invite message is delivered. The IP address is allocated dynamically for the duration of the session.

In certain embodiments of the present invention, the SIP Invite message is sent to the called subscriber from the serving ACP's SIP server in association with the paging message. The SIP Invite message may be sent over a paging channel, e.g. piggybacked on the paging message, or may be sent over a separate channel.

An advantage of sending the SIP Invite message to the called subscriber is that information concerning the source of the Invite message, e.g. the identity of the calling party, may be made available to the called subscriber prior to IP address allocation.

In certain embodiments of the present invention, the serving ACP allocates an IP address to the called mobile subscriber following receipt by the serving ACP of an accept message from the subscriber, sent in response to the paging message. In other embodiments of the invention, an IP address may be associated with the called subscriber upon registration with the network. This may be required, for example, where the SIP Invite message is to be sent to the mobile subscriber. The IP address may be derived from a temporary International Mobile Subscriber Identity (TMSI) allocated to the mobile subscriber, in which case the address is a link local address which is valid only on the link between the mobile terminal and the serving ACP. In other embodiments of the invention, the SIP invite message is sent to a listening mobile terminal using a "broadcast" or "multicast" IP address known to the terminal. The identity of the destination terminal is defined by a unique identifier contained in a message header, e.g. a radio protocol header (RLC or MAC).

In certain embodiments of the present invention, said step of using the SIP URL to determine the identity of a SIP server of an Access Control Point (ACP) with which the mobile subscriber is currently registered, comprises:

identifying a mobile subscriber identity corresponding to a SIP URL contained in the SIP Invite message, said mobile subscriber identity and said SIP URL identifying the called mobile subscriber;

sending a query containing said mobile subscriber identity to a location register which maintains information on the current location of mobile subscribers; and returning the identity of the ACP SIP server to the enquiring SIP server.

The step of identifying a mobile subscriber identity corresponding to a SIP URL contained in the SIP Invite message may be performed at the SIP server.

The SIP server of the mobile network which initially receives the SIP Invite message initiated by the calling party may be implemented in an ACP of a gateway node, e.g. a GGSN.

According to a second aspect of the present invention there is provided a method of initiating an IP session between a calling party and a called mobile wireless subscriber registered with a mobile wireless communication network, the method comprising:

receiving a SIP Invite message at a SIP server of the mobile network, the SIP Invite message containing a SIP URL identifying said mobile subscriber;

identifying a mobile subscriber identity corresponding to a SIP URL contained in the SIP Invite message, said mobile subscriber identity identifying the called mobile subscriber within the mobile network;

broadcasting a paging message to said mobile subscriber; and allocating to the mobile subscriber an IP address following receipt by the network of a paging response message sent by the mobile subscriber.

According to a third aspect of the present invention there is provided a method of initiating an IP communication session between a calling party and a called mobile wireless subscriber registered with a mobile wireless communication network, the method comprising:

receiving a SIP Invite message at a SIP server of the mobile network, the SIP Invite message containing a SIP URL identifying said mobile subscriber;

using the SIP URL to determine the identity of a second SIP server of an ACP with which the mobile subscriber is currently registered;

identifying a mobile subscriber identity corresponding to a SIP URL contained in the SIP Invite message, said mobile subscriber identity identifying the called mobile subscriber within the mobile network;

sending the SIP Invite message from the SIP server to the identified ACP SIP server;

identifying an IP address associated with the called subscriber at the ACP; and sending a SIP Invite message to the called subscriber.

It is noted that the steps of identifying a mobile subscriber identity corresponding to a SIP URL and of sending the SIP Invite message from the SIP server to the identified ACP SIP server are interchangeable. For example, the step of identifying a mobile subscriber identity corresponding to a SIP URL may be carried out by way of a communication between the SIP server and a location register prior to the step of sending the SIP Invite message to the ACP SIP server, or may be carried out by way of a communication between the ACP SIP server and a location register following the step of sending the SIP Invite message to the ACP SIP server.

There are a number of different mechanisms by which the ACP may allocate an IP address to the called mobile subscriber. Standard statefull or stateless address configuration methods are available. For example, the IP address may comprise a prefix associated with the ACP and a body part corresponding to (or derived from) a Temporary Mobile Subscriber Identity allocated to the mobile subscriber. Another method is to utilise a lower layer identity as part of an IP address, e.g. using a Radio Network Temporary Identifier (RNTI) as the host part (in a UMTS network).

According to a fourth aspect of the present invention there is provided a method of forwarding a call to a first subscriber of a communications network, to a second, mobile wireless subscriber of a mobile wireless communication network, the method comprising:

receiving a SIP Invite message at a SIP server of said communication network, the SIP Invite message containing a SIP URL identifying said first subscriber;

sending a SIP Invite message to a SIP server of the mobile wireless communication network;

identifying at the SIP server of the mobile wireless communication network whether an association has been created between the first and second subscribers determining the identity of a SIP server of Access Control Point (ACP) with which the second subscriber is currently registered;

sending a SIP Invite message to the ACP SIP server; and broadcasting a paging message to said second subscriber.

Once the SIP Invite message has been received by the SIP server of the mobile wireless communication network and an associated mobile subscriber identified, the method may proceed according to the method of any one of the above first to third aspects.

In order to initialise the call forwarding procedure, the first subscriber may send a call forwarding instruction to the SIP server of the communications network, notifying the server that subsequent SIP Invite messages destined for the first subscriber are to be forwarded to said mobile communication network Preferably, the association between the first and second subscribers at the SIP server of the mobile communication network is created by the second, mobile subscriber sending an authorisation request to that SIP server. More preferably, this request is ciphered and/or includes a subscriber authorisation.

DETAILED DESCRIPTION OF A PREFERRED EMBODIMENT

Figure 1:
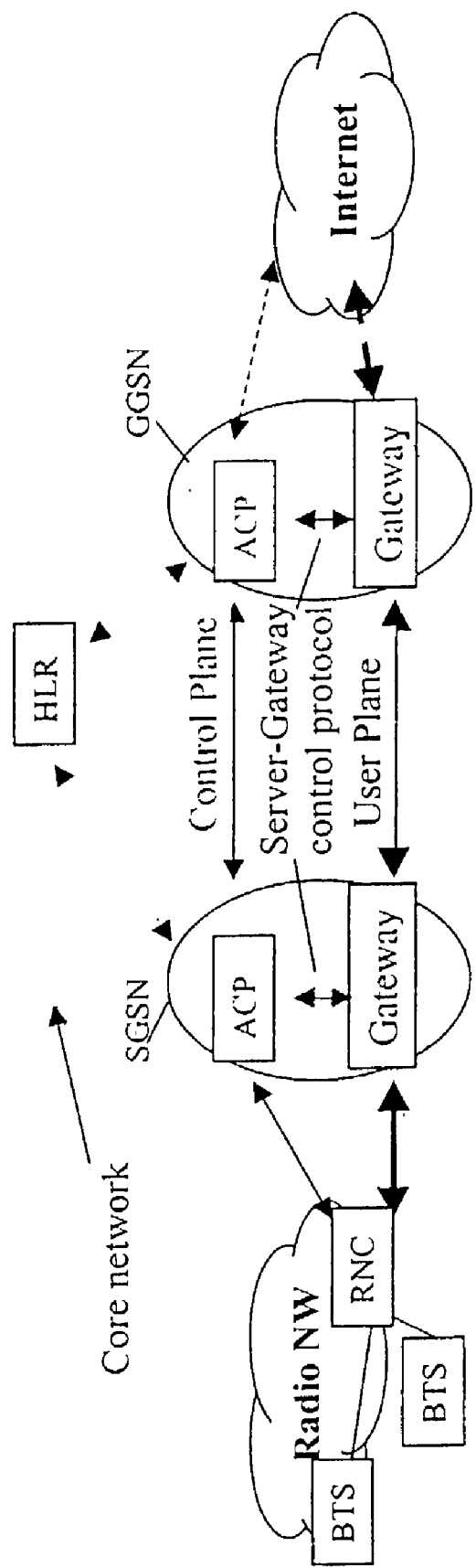
FIG. 1 illustrates schematically a UMTS network architecture for packet switched services.
Figure 2:
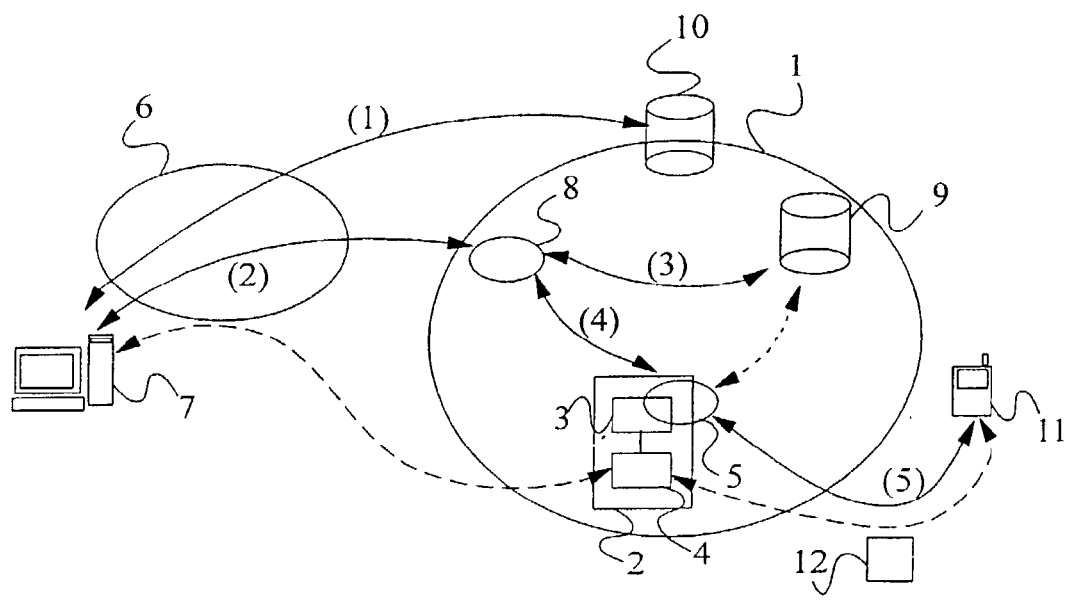
FIG. 2 illustrates schematically a telecommunications system comprising a cellular telecommunications network.

A UMTS network architecture for packet switched services has already been described above with reference to FIG. 1. There is illustrated in FIG. 2 an enhanced UMTS telecommunications system based on the Direct Internet Access (DIA) architecture and comprising a cellular telecommunications network indicated generally by the reference numeral 1. The network 1 comprises a network node 2 which incorporates an ACP 3 (incorporating Media Gateway Controller and mobility management functionality) and a Media Gateway 4. The Media Gateway 4 is controlled by the ACP 3. The ACP 3 implements a SIP server 5 which employs the Internet Engineering Task Force (IETF) Session Initiation Protocol (SIP) (see IETF RFC 2543) for creating, modifying, and terminating sessions with one or more participants. Internet users are able to access the Internet 6, and to communicate with the telecommunications network 1, using terminals such as the computer terminal 7 (it will of course be appreciated that the terminal 7 will be coupled to the Internet 6 via, for example, a modem and an Internet Service Provider).

The network 1 comprises a Home SIP server 8, the function of which is described below. The network 1 also comprises a Home Location Register (HLR) 9 which records the current location of subscribers to the network 1. For example, if a subscriber is currently registered with the network 1 (i.e. his home network), the HLR 9 will record the ACP 3 (or rather the IP address of the SIP server 5) to which the subscriber is attached. If the subscriber is attached to a foreign network, the HLR 9 will record the identity of the ACP to which the subscriber is attached in the foreign network. The telecommunications network 1 is provided with a Domain Name System (DNS) server 10 which is able to resolve standard domain names (e.g. sip.operator.com) into respective IP addresses.

The operation of the system of FIG. 2 will now be described, vis-à-vis the communication of Internet Protocol (IP) data to and from a mobile terminal 11 which is used by a subscriber of the network 1 (nb. the solid lines in FIG. 2 illustrate the flow of signalling information which is exchanged between the various gateways and the calling and called parties, whilst the broken lines illustrate the flow of user data). Following power-up of the terminal 11, the terminal 11 attaches to the ACP 3 via an RNC 12, and registers with its home network 1. Registration involves notifying the HLR 9 of the location of the terminal 11, as well as the IMSI and SIP URL of the terminal 11, where the SIP URL may be a name (e.g. sip:jimjones@company.com) or a telephone number (e.g. +1-212-555-1212@company-.com). In this state, the terminal 11 is described as being in a Connected state, and has an active mobility management context in the network 1 (i.e. in the ACP 3).

Assume now that the user of the computer terminal 7 initiates a call to the subscriber with the mobile terminal 11. To do this the computer terminal 7 must send a SIP Invite message to the Home SIP server 8 using the IP address of the Home SIP server 8. If the terminal 7 does not know the IP address, but rather knows only the SIP URL (i.e. sip: UE@sip.operator.com), the terminal 7 may use the domain name part of the SIP URL to retrieve the corresponding IP address from the DNS server 10 (phase (1)). Phase (2) involves the sending of a SIP Invite message to the Home SIP server 8 over the Internet 7.

At the time that the Home SIP server 8 receives the SIP Invite message, it does not know the current location of the called subscriber 11. The Home SIP server 8 must therefore contact the HLR 9 (phase (3)). The Home SIP server 8 sends the SIP Invite message (or some relevant portion thereof) to the HLR 9. The HLR 9 uses the SIP URL of the called subscriber to determine that subscriber's International Mobile Subscriber Identity (IMSI) which uniquely identifies the subscriber. The HLR 9 then identifies the current location (i.e. the SIP server 5 of the ACP 3 to which the subscriber is attached) of the subscriber and returns this, together with the IMSI, to the Home SIP server 8. At the Home SIP server 8, the ACP SIP server identity is converted into an IP address using, for example, a translation table in a DNS node. Alternatively, this translation may be done at the HLR 9 with the IP address being returned to the Home SIP server 8.

Once the Home SIP server 8 knows the IMSI and the current location of the mobile subscriber 11, the Home SIP server 8 forwards a SIP Invite message to the relevant ACP SIP server 5 (phase (4)). The ACP 3 may be in the home PLMN or in a foreign PLMN. The IMSI is piggybacked onto the SIP Invite message. The ACP SIP server 5 buffers the SIP Invite message whilst the RNC 12 issues a paging message to the mobile subscriber 11 using a broadcast paging channel (phase (5)). In the event that the mobile subscriber responds to the paging message, the ACP 3 is notified of the response and allocates an IP address to the mobile subscriber 11. The buffered SIP Invite message can then be forwarded to the subscriber 11 using IP (over the various connection and transport protocols). Upon receipt of the SIP Invite message (which will advise the mobile subscriber 11 of the calling party's identity), the mobile subscriber 11 can accept or reject the call. In the former case, the subscriber's terminal generates an appropriate SIP message which is returned, via the SIP servers 5,8, to the calling party's terminal 7. In the latter case, the ACP SIP server 5 will generate and return an appropriate SIP message (e.g. "not available at the moment") to the calling party's terminal 7.

Figure 3:
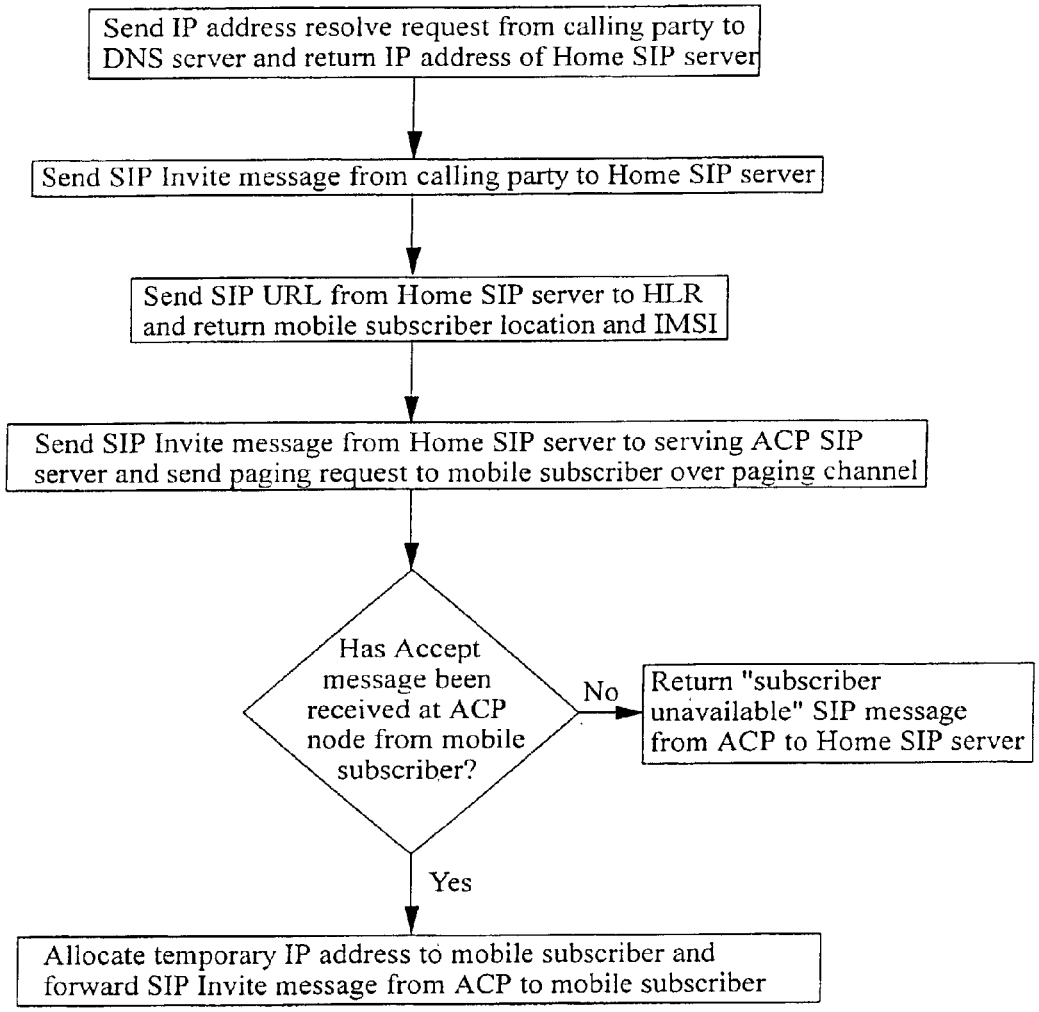
FIG. 3 is a flow diagram illustrating a method of setting up a connection from a calling party to a subscriber of the cellular telecommunications network of FIG. 2.
Figure 4:
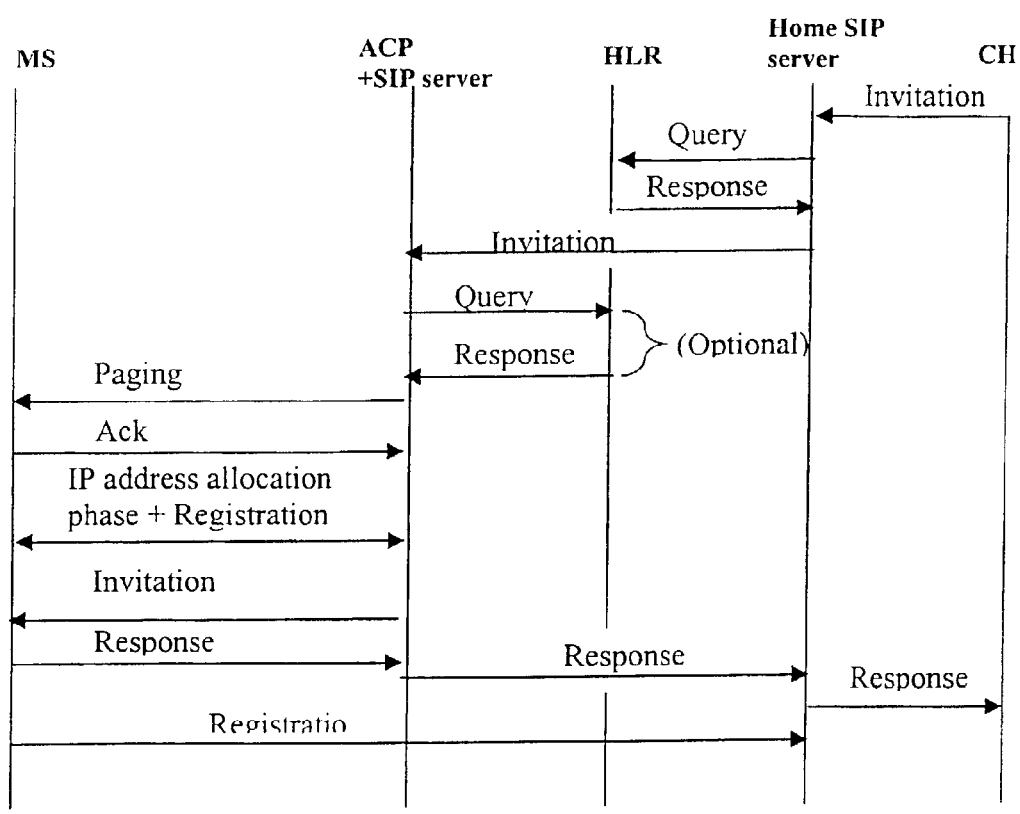
FIG. 4 illustrates the signalling messages exchanged during an IP connection phase in the network of FIG. 2.
Figure 5:
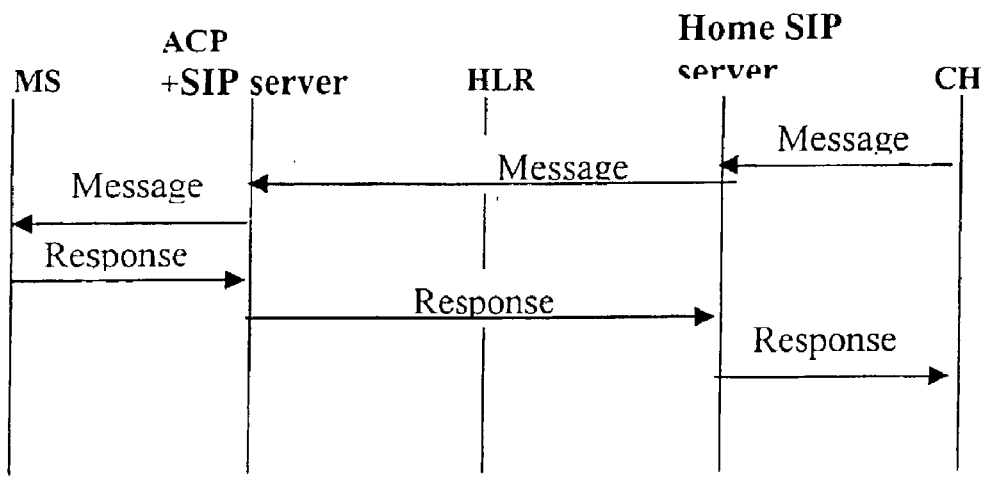
FIG. 5 illustrates the signalling messages exchanged in the network of FIG. 2, following the signalling exchange of FIG. 4.
Figure 6:
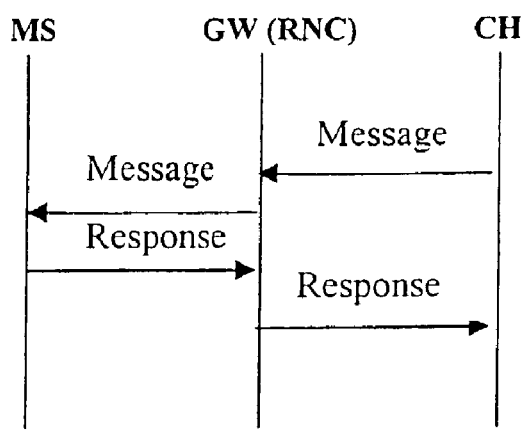
FIG. 6 illustrates the flow of data in the user plane, in the network of FIG. 2.
Figure 1:
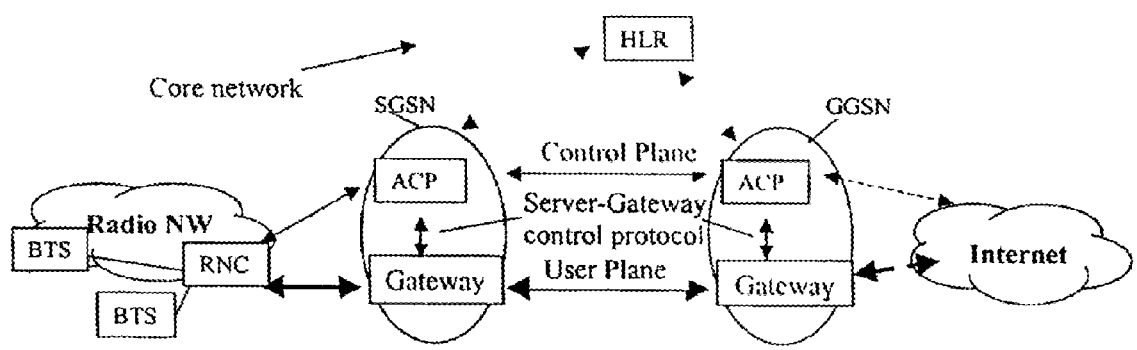
Figure 2:
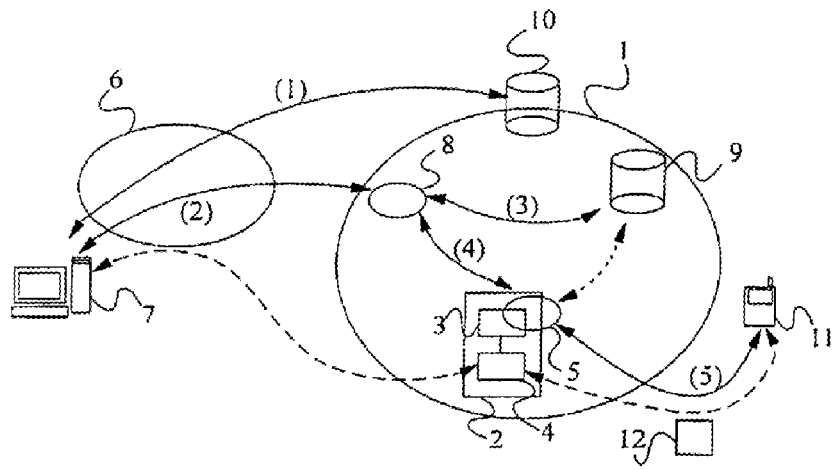
Figure 7:
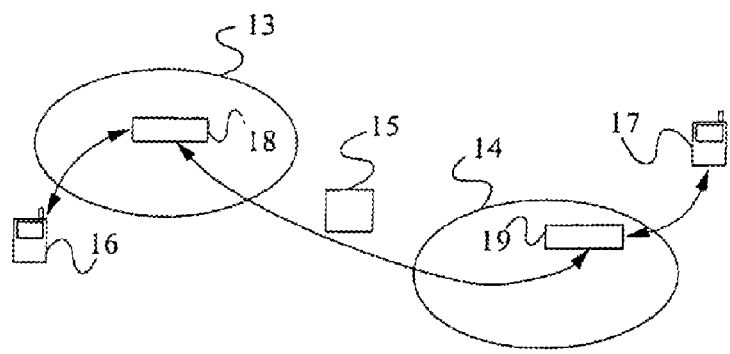

FIG. 3 is a flow diagram further illustrating the method of setting up a connection between the calling party 7 and the mobile subscriber 11. It is noted that this scenario assumes that the mobile subscriber does not already have an IP address allocated to it. If an IP address is allocated, then the SIP Invite message may be sent directly to the subscriber's terminal 11. FIG. 4 illustrates the signalling messages exchanged between the various nodes during the IP connection phase described above. FIG. 5 illustrates the signalling messages exchanged between these nodes once an active connection has been established (i.e. after the signalling phase of FIG. 4), where MS indicates the Mobile Station or terminal and CH represents the Correspondent Host. It will be noted that as the SIP server 8 already knows the location of the mobile subscriber 11, there is no need for the server to again contact the HLR 11. FIG. 6 illustrates the flow of data in the user plane, from which it will be apparent that the CH is able to send SIP messages (and other data) directly to the MS using the IP address in the gateway.

In a modification to the embodiment described above, an IP address may be associated with the called subscriber, upon registration of the subscriber with the network 1. The SIP Invite message can then be piggybacked onto the paging message or possibly sent over a separate broadcast or multicast channel to which the subscriber's terminal 11 listens upon receipt of the paging message. The IP address allocated to the mobile subscriber 11 at this stage does not need to be globally unique, as it is only used within the network 1. A globally unique IP address need only be allocated to the called subscriber once the subscriber has decided to accept the SIP Invite, and wishes to begin communicating over the Internet 6.

The initial IP address may be allocated as follows. When the mobile subscriber 11 registers with the network 1, he is allocated (according to UMTS and GSM) a temporary IMSI (TMSI) which is normally used instead of the IMSI in signalling between the subscriber's terminal 11 and the network 1, in order to conceal the subscriber's identity. Upon receiving the TMSI, the subscriber's terminal 11 generates a link-local IP address by combining the link-local address prefix and the TMSI. The mobile network uses this IP address for SIP invitation for as long as the TMSI is allocated to the subscriber. An alternative method for allocating an IP address for use in transmitting a SIP Invite message to a mobile subscriber, involves the sending of IP addresses using a multicast or broadcast IP address known to the subscriber's terminal. A mobile terminal listens to the appropriate channel and adopts an IP address. The choice of IP address is then notified to the network 1.

Figure 7:
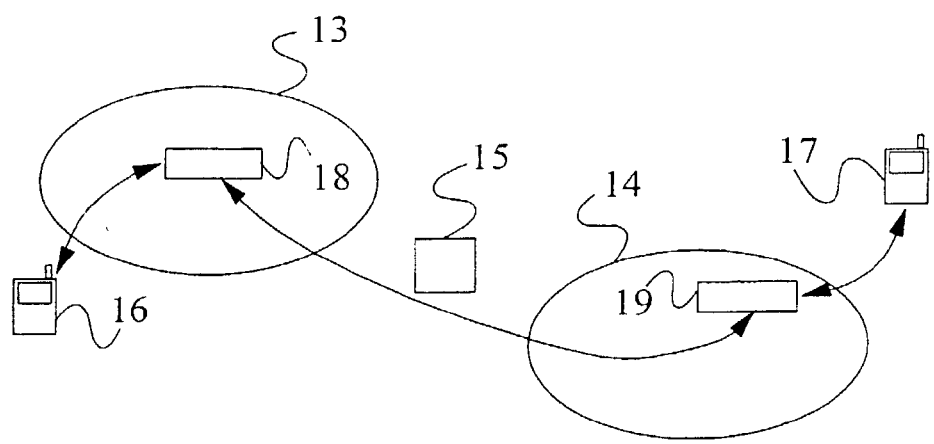
FIG. 7 illustrates schematically a telecommunications system comprising a pair of cellular telecommunications network.

FIG. 7 illustrates a pair of cellular telecommunication networks 13,14 interconnected by a gateway 15. Assume that a "Sam Smith" is a subscriber of a first of the networks 13 and a "Jim Jones" is a subscriber of the second network 14, with Sam and Jim using mobile terminals 16 and 17 respectively. In some circumstances, Sam Smith may wish to have calls made to him, transferred to Jim Jones. If SIP is being used for end-to-end call control, call forwarding requires both Sam Smith and Jim Jones to notify their respective home networks of the call forwarding operation.

The operation of the SIP server in identifying the location (and IMSI) of a called mobile subscriber has already been described above with reference to FIGS. 2 to 6. It will therefore be appreciated that various SIP servers will be present in both of the home networks. In particular, FIG. 7 illustrates a Home SIP server 18 associated with a HLR of Sam's network 13, whilst a Home SIP server 19 is associated with the HLR of Jim's network. To enable call forwarding, SIP server 18 maintains a subscriber record for each subscriber. A record for a subscriber can have attached to it (a) the subscriber's SIP URL, (b) the subscriber's encryption key (or password for authentication purposes, (c) a call forward request, giving the SIP URL of the subscriber to whom calls must be forwarded and/or (d) an authorisation to accept incoming calls forwarded from another subscriber.

Considering again the example of Sam Smith and Jim Jones, to allow forwarding of calls from the former to the latter, Jim Jones must first send an authorisation to the SIP server 19 of his home network 14 to accept calls forwarded from Sam Smith. When Sam Smith wishes to activate call forwarding, he sends a call forwarding instruction containing Jim Jones' SIP URL to the SIP server 18 of his home network 13. When a SIP Invite addressed to Sam Smith is received at the SIP server 18 of Sam Smith's home network 13, the SIP server 18 recognises the call forwarding instruction and forwards the SIP Invite to the SIP Server 19 of Jim Jones' home network 14.

The SIP Server 19 identifies Sam Smith's SIP URL in the SIP Invite message, and also identifies the association of this SIP URL with Jim Jones' SIP URL (association between the forwarding subscriber and the destination subscriber may alternatively be achieved using IMSIs, IMEIs, etc). The SIP connection process can then proceed as described above, with a SIP Invite message being sent to the serving ACP (not illustrated in FIG. 7) serving Jim Smith. Jim Jones' mobile terminal is then paged and, assuming that Jim Jones accepts the call, a temporary IP address allocated by the serving ACP. The call forwarding authorisation at the SIP server 19 or the call forwarding instruction at the SIP server 18 may be cancelled by the respective subscribers. Instructions sent to the SIP servers 18,19 are preferably ciphered and use authentication techniques to ensure the security of the service.

It will be appreciated by the skilled person that various modifications may be made to the above described embodiments without departing from the scope of the present invention. For example, it may be that the HLR 9 returns to the SIP server 8 only the location of the called mobile subscriber 11, and not the subscriber's IMSI. In that case, when the ACP 3 receives the forwarded SIP Invite message, the ACP 3 must contact the HLR 9 to obtain the subscriber's IMSI (illustrated by the dotted line in FIG. 1). It may also be that the SIP URL to IMSI conversion is done at the SIP server 8 (or at the ACP 3). However, a disadvantage of such arrangements would be the need to maintain up-to-date customer databases at multiple locations.

The invention claimed is:

1. A method of alerting a mobile wireless subscriber registered with a mobile wireless communication network to a session initiation request sent by a calling party, wherein a SIP server associated with said mobile wireless communication network receives a SIP Invite message containing a SIP URL identifying said mobile wireless subscriber wherein said SIP URL determines the identity of a second SIP server of a Access Control Point (ACP) serving said mobile wireless subscriber and further sends said SIP Invite message to said second SIP server, comprising the steps of:

receiving a SIP Invite message at said second SIP server; and causing a paging message to be broadcast to said mobile subscriber;

wherein an IP address, for use in providing the service to which the SIP Invite message relates, is allocated to the mobile wireless subscriber after receipt of the paging response message at said second SIP server.

2. A method according to claim 1 further comprising the step of identifying a mobile subscriber identity corresponding to said SIP URL contained in the SIP Invite message, said mobile subscriber identity and said SIP URL identifying the called mobile subscriber.

3. A method according to claim 2, wherein an association between SIP URLs and mobile subscriber identities is maintained by a location register of the mobile network.

4. A method according to claim 3, wherein the location register maintains information on the current location of mobile subscribers.

5. A method according to claim 4, wherein, upon receipt of said SIP invite message at the SIP server, the SIP server sends a query, containing the SIP URL of the called mobile subscriber, to the location register which responds by returning the associated mobile subscriber identity and the current location of the mobile subscriber.

6. A method according to claim 5, wherein the current location is the identity of said second SIP server.

7. A method according to claim 5, further comprising the steps of:

providing to the SIP server the current location of the called subscriber by said location register; and transmitting a query to the location register in order to retrieve the mobile subscriber identity by said ACP.

8. A method according to claim 4, further comprising the step of sending a SIP Invite message to said second SIP server in response to receiving the called mobile subscriber's current location from said location register.

9. A method according to claim 8, wherein said subscriber identity is an International Mobile Subscriber Identity (IMSI), and the IMSI is included in the SIP Invite message sent to said second SIP server.

10. A method according to claim 8, wherein said second SIP server buffers the received message whilst a paging message is sent over the air interface to the called subscriber.

11. A method according to claim 8, further comprising the step of allocating an IP address to the called subscriber in response to a connection established between the called subscriber and the ACP.

12. A method according to claim 8, wherein the SIP Invite message is sent to the called subscriber from the serving ACP's SIP server in association with the paging message.

13. A method according to claim 12, wherein the SIP Invite message is sent over a separate broadcast channel.

14. A method according to claim 8, wherein said ACP allocates an IP address to the called mobile subscriber following receipt by the ACP of an accept message from the subscriber, sent in response to the broadcast paging message.

15. A method according to claim 8, wherein an IP address is allocated to the called subscriber upon registration with the network.

16. A method according to claim 15, wherein the IP address is derived from a temporary International Mobile Subscriber Identity (TMSI) allocated to the mobile subscriber.

17. A method according to claim 1, wherein said step of using the SIP URL to determine the identity of an Access Control Point (ACP) with which the mobile subscriber is currently registered comprises:
  identifying a mobile subscriber identity corresponding to a SIP URL contained in the SIP Invite message, said mobile subscriber identity and said SIP URL identifying the called mobile subscriber;
  sending a query containing said mobile subscriber identity to a location register which maintains information on the current location of mobile subscribers; and
  returning the identity of the ACP SIP server to the enquiring SIP server.

18. A method of initiating an IP session between a calling party and a called mobile wireless subscriber registered with a mobile wireless communication network, the method comprising:
  receiving a SIP Invite message at a SIP server of the mobile network, the SIP Invite message containing a SIP URL identifying said mobile subscriber;
  identifying a mobile subscriber identity corresponding to a SIP URL contained in the SIP Invite message, said mobile subscriber identity identifying the called mobile subscriber within the mobile network;
  broadcasting a paging message to said mobile subscriber; and
  allocating to the mobile subscriber an IP address following receipt by the network of a paging response message sent by the mobile subscriber.

19. A method of forwarding a call from a first subscriber of a communications network to a second mobile wireless subscriber of a mobile wireless communication network, the method comprising:
  receiving a SIP Invite message at a SIP server of said communication network, the SIP Invite message containing a SIP URL identifying said second mobile wireless subscriber;
  sending the SIP Invite message to a second SIP server of the mobile wireless communication network;
  identifying at the second SIP server of the mobile wireless communication network whether an association has been created between the first subscriber and second mobile wireless subscriber;
  determining the identity of a third SIP server of an Access Control Point (ACP) with which the second mobile wireless subscriber is currently registered;
  sending the SIP Invite message to said third SIP server; and
  broadcasting a paging message to said second mobile wireless subscriber.

20. A method according to claim 19, wherein the association between the first and second subscribers at the SIP server of the mobile communication network is created by the second mobile subscriber sending an association request to said second SIP server.

21. A method according to claim 19 further comprising the step of identifying a mobile subscriber identity corresponding to said second SIP URL contained in said SIP Invite message, said mobile subscriber identity and said SIP URL identifying said second mobile wireless subscriber.

22. A method of claim 19 wherein in response to receiving said SIP Invite message at said second SIP server, said second SIP server sending a query message to a location register associated with said mobile wireless communication network.

23. A method of claim 22 wherein said query message contains said SIP URL of said second mobile wireless subscriber and further comprises the step of said location register returning a mobile subscriber identity and the current location of said second mobile wireless subscriber.

24. A method of claim 23 wherein said current location of said second mobile wireless subscriber identifies said third SIP server.

25. A method of claim 19 further comprising the step of allocating an IP address to said second mobile wireless subscriber in response to a connection being established between said first subscriber and said ACP.

26. A system of alerting a mobile wireless subscriber registered with a mobile wireless communication network to a session initiation request sent by a calling party and wherein said mobile wireless subscriber is registered with a first SIP server wherein said first SIP server receives a SIP Invite message containing a SIP URL identifying said mobile wireless subscriber and wherein said that SIP server further determines the identity of a second SIP server of a Access Control Point (ACP) serving said mobile wireless subscriber and transmits said SIP Invite message to said second SIP server, further comprising:
  means for receiving said SIP Invite message at said second SIP server;
  means for causing a paging message to be broadcast to said mobile wireless subscriber;
  means for allocating an IP address to said mobile wireless subscriber for use in providing the services to which said SIP Invite massage relates after receipt of the paging response message.

27. A system of claim 26 further comprising means for identifying a mobile subscriber identity corresponding to said SIP URL contained in said SIP Invite message, said mobile subscriber identity and said SIP URL identifying said called mobile wireless subscriber.

28. A system of claim 26 further comprising a local register associated with said mobile wireless communications network for storing data correlating said SIP URL with said motile subscriber identity.

29. A system of claim 26 further comprising means for allocating an IP address to said called mobile wireless subscriber in response to a connection being established between said called mobile wireless subscriber and said ACP.

* * * * *

UNITED STATES PATENT AND TRADEMARK OFFICE
CERTIFICATE OF CORRECTION

PATENT NO. : 7,193,987 B2
APPLICATION NO. : 10/239019
DATED : March 20, 2007
INVENTOR(S) : Harri Tapani Vilander It is certified that error appears in the above-identified patent and that said Letters Patent is hereby corrected as shown below:

Delete Drawing Sheets 1 & 2 and Replace with Drawing Sheets 1 & 2 (Attached)

In Column 1, Line 60, after "architecture" insert -- 1 --.

In Column 1, Line 64, after "ACP" insert -- 3 --.

In Column 1, Line 65, after "(SGSN)" insert -- 15 --.

In Column 1, Line 67, delete "(GGSN)." and insert -- (GGSN) 25. --, therefor.

In Column 2, Line 2, after "ACP" insert -- 3 --.

In Column 2, Line 6, after "node" insert -- 4 --.

In Column 2, Line 7, delete "node." and insert -- node 12. --, therefor.

In Column 2, Line 7, after "ACP" insert -- 3 --.

In Column 3, Line 48, delete "UTRL" and insert -- URL --, therefor.

In Column 3, Line 62, delete "sender" and insert -- server --, therefor.

In Column 7, Line 23, delete "sip:jimjones@company.com" and insert -- sip:jim.jones@company.com --, therefor.

In Column 10, Line 6, in Claim 1, delete ";" and insert -- , --, therefor.

In Column 11, Line 42, in Claim 19, after "and" insert -- said --.

In Column 11, Line 52, in Claim 20, after "at the" insert -- second --.

In Column 12, Line 28, in Claim 26, delete "that" and insert -- first --, therefor.

In Column 12, Line 39, in Claim 26, delete "massage" and insert -- message --, therefor.

UNITED STATES PATENT AND TRADEMARK OFFICE
CERTIFICATE OF CORRECTION

PATENT NO. : 7,193,987 B2
APPLICATION NO. : 10/239019
DATED : March 20, 2007
INVENTOR(S) : Harri Tapani Vilander It is certified that error appears in the above-identified patent and that said Letters Patent is hereby corrected as shown below:

In Column 12, Line 50, in Claim 28, delete "motile" and insert -- mobile --, therefor.

Signed and Sealed this

Eighth Day of April, 2008

JON W. DUDAS
*Director of the United States Patent and Trademark Office*